Dec. 25, 1951 LE ROY J. WADZINSKI 2,579,633

VARILOAD AND VARIBIAS CIRCUIT

Filed March 1, 1946

Inventor

LEROY J. WADZINSKI,

By McMorrow, Berman and Davidson

Attorneys

Patented Dec. 25, 1951

2,579,633

UNITED STATES PATENT OFFICE 2,579,633

VARILOAD AND VARIBIAS CIRCUITS

Le Roy J. Wadzinski, Chicago, Ill.

Application March 1, 1946, Serial No. 651,405

1 Claim. (Cl. 250—27)

This invention relates to vari-load and vari-bias circuits which may be understood to comprise that class of electronic circuits wherein the load or the bias of one vacuum tube includes a further vacuum tube or a gas filled tube.

It is an object of the invention to provide circuits of the above character which shall translate a square wave into a peaked or other wave form, the translation being effected over a wide range of frequencies with equal facility. In this respect my novel circuits represent an improvement over circuits depending upon circuit constants to wit, resistance and capacitance, for obtaining such effects.

Reference is made to the accompanying drawings, wherein.

Figures 1, 2, 3, 4, 5, 6, 7, 8:
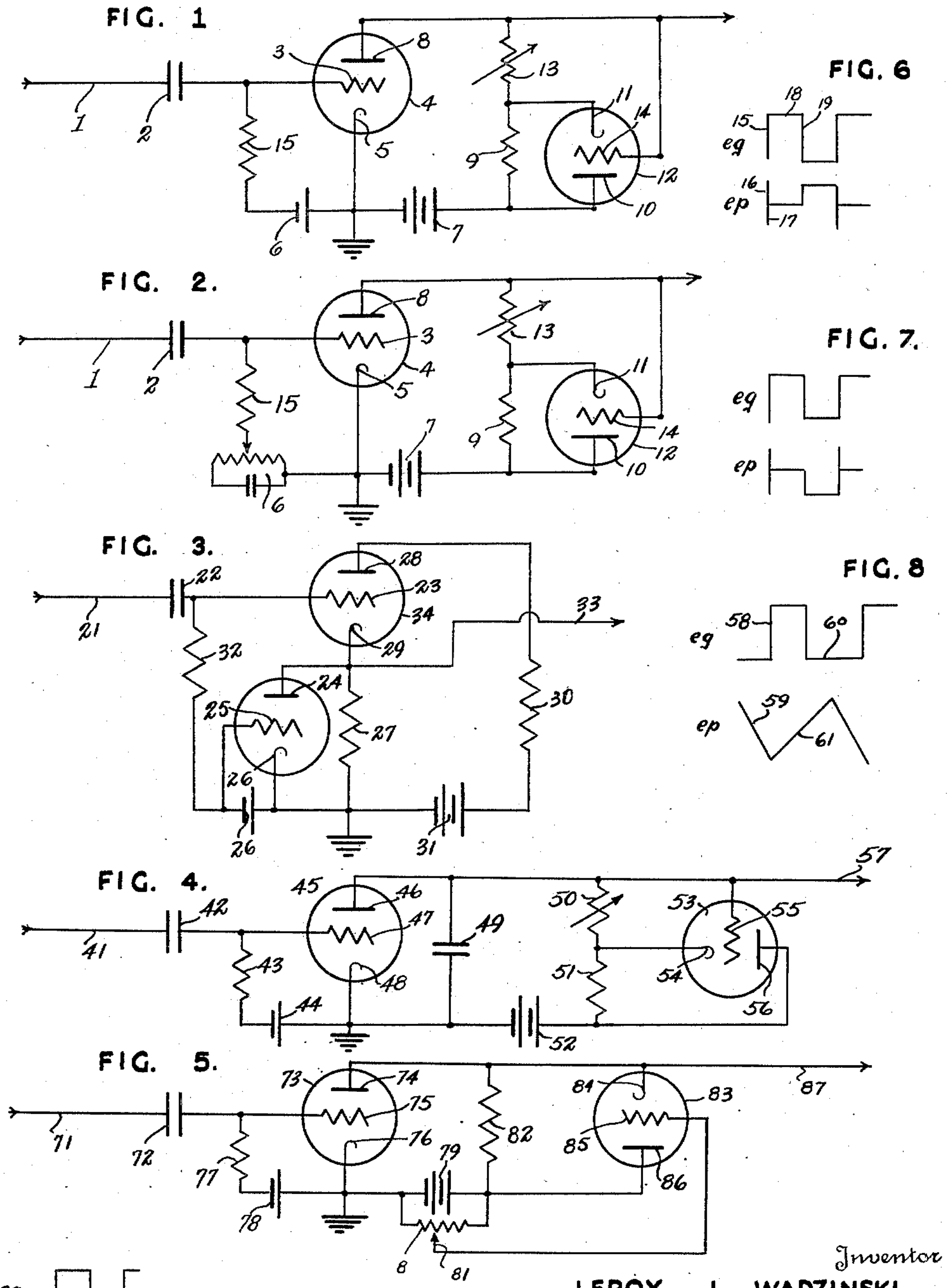
Figure 1 is an example of a vari-load circuit utilizing a vacuum tube as part of the load circuit.
Figure 2 is a peaking circuit similar to Figure 1 but in which a gas-filled triode is substituted for the vacuum tube load of Figure 1.
Figure 3 is a vari-bias peaking circuit.
Figure 4 is an embodiment of a vari-load device for producing saw-tooth waves.
Figure 5 is another embodiment of a vari-load device utilized as a pulse limiter circuit.
Figure 6 illustrates input and output voltage forms provided by the circuit of Figure 2.
Figure 7 illustrates input and output voltage forms provided by the circuit of Figure 3.
Figure 8 illustrates input and output voltage forms provided by the circuit of Figure 4.

In Figure 1 of the accompanying drawings, an input square pulse is applied via the input lead 1, and the coupling condenser 2 to a grid 3 of vacuum tube 4. A grid leak 15 is connected from grid 3 to cathode 5, in series with a bias battery 6 in the usual manner.

Plate battery 7 is connected to the plate 8 of the tube 4 via a resistor 9 in parallel with the plate 10 to cathode 11 impedance of a vacuum tube 12, the said parallel circuit being connected in series with a variable resistor 13. The grid 14 of the tube 12 connected to the plate 8 of the tube 4, and output is derived from the plate 8.

It will be noted that the plate 10 of tube 12 is connected directly to the positive terminal of the battery 7, the cathode 11 is connected to the junction of the resistors 9 and 13, and the grid 14 is connected to the plate 8 of tube 4. Therefore cathode 11 will always be negative with respect to plate 10 and grid 14 will always be biased negative with respect to cathode 11. The internal impedance of tube 12 will depend upon how far negative grid 14 is with respect to cathode 11.

Assume that a square input pulse is applied to input line 1. During the positive rise of the pulse, the plate current of tube 4 causes the voltage drop across resistor 13 to increase sharply and therefore causes the internal impedance of tube 12 to rise sharply, due to the sharp increase of the negative bias of grid 14 with respect to cathode 11. The negative bias provided by battery 6 is sufficiently low so that tube 4 still conducts even at the negative portions of the pulse, i. e., tube 4 is biased for Class A operation. However, at points of low or negative potential of the input pulse, the amount of plate current flowing in tube 4 is so small that the voltage drop across resistor 13 is negligible. The negative bias on grid 14 therefore approaches zero, and the cathode and grid potentials of the tube 12 therefore approach the potential of the plate 10, since the voltage drop across resistor 9 also is negligible. Under these conditions the tube 12 presents a low impedance in parallel with the resistor 9. The extent to which the tube 12 parallels the resistance 9 may be controlled by applying signal to the grid 14.

It will be evident that the value of the resistance 13 will determine the peak amplitudes attained by pulses at the output of the circuit of Figure 1, and that for input pulses of a given magnitude, output pulses of selectable magnitude may be derived from the circuit.

In the extreme and ideal case wherein the impedance of the tube 12 varies between short and open circuit it will be evident that the resistor 13 is in series with either the full resistance of the resistor 9 or by a resistance of zero value, in response to the flat values of a square pulse, whereby the circuit of Figure 1 provides a greater pulse at its output than is possible with conventional circuits utilizing a tube 4 having a given amplification factor.

The provision of a gas filled tube in place of a vacuum tube in the load circuit of the tube 4, as shown in Figure 2, results in a different action than was true of Figure 1. Referring to Figure 6, it will be seen that the steep rise 15 of grid voltage applied to grid 3 of tube 4 is accompanied by an equally steep drop 16 in plate voltage on tube 4 caused by the increase in plate current of tube 4. During this drop in plate voltage the tube 12 remains non-conductive. At the lowermost point in the plate voltage curve the cathode 11 of the tube 12 becomes sufficiently negative with respect to the plate 10 to fire the tube 12. Upon firing of the tube 12 the resistance 9 is virtually short circuited resulting in a sudden rise in plate voltage on tube 4, as indicated at 17, Figure 6, the plate voltage remaining at its risen value for the duration of the flat 18 of the grid voltage curve. The subsequent drop of grid voltage 19 results eventually in reestablishment of the tube 12 in non-fired condition, in readiness for the next cycle. It will be evident that the above described mechanism provides sharp peaks of plate current which are independent of frequency, as regards sharpness of peaking or magnitude of peak voltage.

Referring now to Figure 3 of the drawings, a pulse signal may be applied at line 21, and reaches the grid 23 of the tube 34 via coupling condenser 22, grid leak being provided by the resistor 32 connected between grid 23 and ground, it being understood that a bias battery 26 may intervene between grid leak 32 and ground, as needed. The tube 34 is provided with a load 30 connected in series with plate battery 31 and plate 28 and a further load 27 of the cathode follower type, from which output voltage may be taken by the lead 33.

Connected across the cathode resistor 27 is a gas filled triode 25′ having plate 24, grid 25 and cathode 26.

Upon application of a pulse to the lead 21, the rise in pulse voltage is accompanied by a rise in output voltage across resistor 27, which continues until the tube 25′ is provided with sufficient voltage to cause firing thereof. At this point the output voltage drops sharply since cathode resistor 27 is virtually short circuited. Reduction of the pulse amplitude, as at 19 of Figure 6 results in removal of firing voltage from across tube 25′, thereby causing the tube to deionize and become reestablished for a succeeding cycle of operations.

The input signal $e_g$ and the output voltage are illustrated in Figure 7 hereof and are believed to be sufficiently obvious to require no explanation.

Figure 4 of the drawings illustrates a circuit for producing saw tooth voltages in response to square waves.

Upon application via lead 41 of a square pulse 58 to grid 47 of tube 45 via coupling condenser 42, the tube 45 becomes conductive presenting low resistance to the voltage present across the condenser 49 and permiting the condenser 49 to discharge rapidly therethrough, as at 59, Figure 8. The bias battery 44 acting through grid leak 43 is of sufficiently high value to bias tube 45 to cutoff in the absence of positive pulse.

Upon reduction of the pulse amplitude to the value shown at 60, Figure 8, the tube 45 becomes biased to cutoff, and the condenser 49 proceeds to charge from battery 52, via the load comprising the resistor 50 in series with the resistor 51 which is itself in parallel with a vacuum triode 53, having cathode 54, grid 55 and plate 56. The grid 55 is connected directly to the positive plate of the condenser 49 and is therefore constrained to follow the voltage excursions of the condenser 49.

Since part of the charging path for the condenser 49 is provided through the tube 53, it will be apparent that the more rapid the charging tends to be and the more negative the grid 55 becomes, the greater is the tendency for tube 53 to cut down the charging rate. On the other hand a slow rate of charge reduces the negative bias on the grid 55 and tends to increase the charging rate.

Presence of the tube 53 in the circuit of Figure 4 and with the connections illustrated tends to linearize the charging rate of the condenser 49 and hence the saw tooth characteristic produced by the circuit of Figure 4.

Figure 5 presents a form of limiter circuit, providing constant pulse output for various magnitudes of input pulse.

Figure 9:
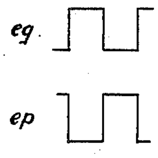
Figure 9 illustrates input and output voltage forms provided by the circuit of Figure 5.

A positive pulse signal $e_g$ (Figure 9) is applied to the lead 71, and via the coupling condenser 72 and grid leak 77 is applied across the grid cathode circuit 75, 76 of the tube 73. Bias battery 78 is provided normally to bias the tube 73 to cut-off.

Application of a positive pulse to the grid 75 of tube 73 enables this tube to pass current, which is supplied via the gas filled triode 83, having cathode 84, grid 85 and plate 86.

The plate 86 is connected in series with the plate supply 79 and suitable voltage for the grid 85 may be obtained by tap 81 from a potentiometer resistor 80 connected across the battery 79.

Resistor 82 is provided as a partial load circuit for the tube 73 and serves to provide a current path, when tube 83 is cut off, for the tube 73.

The maximum change in voltage which can take place in the line 87 is determined by the drop of voltage across tube 83 which tends to be constant once the tube has fired.

Between pulses the tube 73 is cut off by the bias battery 78 and thereby the current in tube 83 is also interrupted.

I have described five embodiments of the invention wherein it will be apparent that various modifications in circuit arrangement and in values of circuit elements and in types of tubes utilized may be resorted to without violating the spirit of the invention as defined by the appended claim.

What I claim and desire to secure by Letters Patent of the United States is:

A signal amplifier of the class described comprising a first electron tube having a cathode, a plate and a control grid, means connected between said control grid and cathode biasing said tube for amplifier operation, a direct current source having its negative terminal connected to said cathode, a variable resistor and a fixed resistor connected in series respectively between said plate and the positive terminal of said source and defining purely resistive path for the plate current of said tube, and a second electron tube having a cathode, a plate and a control grid, said last-named cathode being connected to the junction of said resistors, said last-named plate being connected to said positive terminal and said last-named grid being connected to the plate of said first tube, said second tube being arranged to define a variable impedance across said fixed resistor which has a high value during the positive rise of a pulse applied to the grid of the first tube and a low value at points of low or negative potential of said pulse, whereby an amplified pulse voltage is obtained across the plate and cathode of said first tube whose amplitude may be controlled by adjusting the value of said variable resistor.

LE ROY J. WADZINSKI.

REFERENCES CITED

The following references are of record in the file of this patent:

UNITED STATES PATENTS

| Number | Name | Date |
|---|---|---|
| 1,958,027 | Wheeler | May 8, 1934 |
| 2,280,733 | Tolson | Apr. 21, 1942 |
| 2,280,990 | White | Apr. 28, 1942 |
| 2,343,290 | Francis | Mar. 7, 1944 |
| 2,418,892 | Lord, Jr. | Apr. 15, 1947 |
| 2,438,960 | Blitz | Apr. 6, 1948 |
| 2,442,286 | Dodds | May 25, 1948 |
| 2,511,595 | Loughren | June 13, 1950 |